April 27, 1965 B. D. LOUGHLIN 3,181,067

MUTING CIRCUIT FOR SIGNAL-TRANSLATING APPARATUS

Filed Jan. 24, 1961

3,181,067
MUTING CIRCUIT FOR SIGNAL-TRANSLATING APPARATUS

Bernard D. Loughlin, Huntington, N.Y., assignor to Hazeltine Research, Inc., a corporation of Illinois Filed Jan. 24, 1961, Ser. No. 84,666
6 Claims. (Cl. 325—348)

Figures 1, 3:
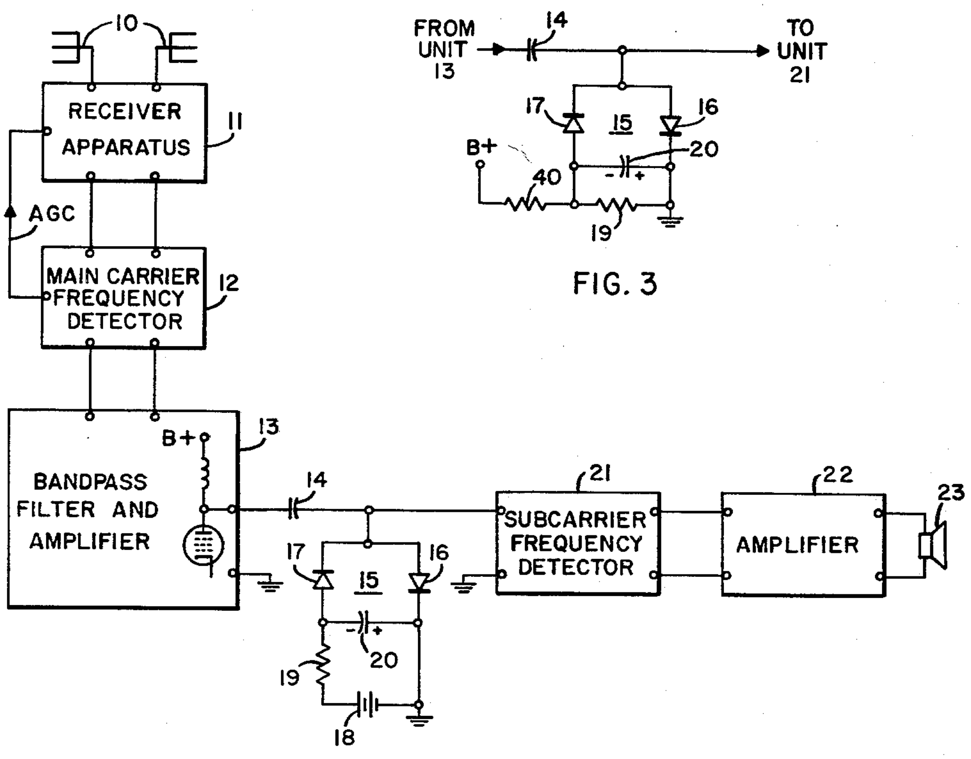

This invention relates to a muting circuit for the signal-translating apparatus of a frequency-modulation (FM) receiver. Although believed to be of general utility in any type of FM receiver, it will be described in connection with the subcarrier channel of an FM/FM multiplex receiver.

With an FM/FM multiplex receiver, for example of the type adapted to receive SCA (Subsidiary Communications Authorization) subscription-type signals, a hissing sound may be heard from the receiver whenever the subcarrier is removed from the multiplex signal at the transmitter, particularly in an area having a low background noise level, such as an office waiting room. Since it is the practice of many, if not all, subcarrier stations to remove the subcarrier signal between musical selections, this means that the listener may be subjected to this annoying sound some four or five times in the period of half an hour.

Muting circuits used to eliminate background noise from an FM receiver are well known, an example of which is the interstation muting circuit used to eliminate the rush of noise heard by the listener while tuning the receiver between stations. Various other arrangements have been designed to aid in suppressing background noise during the reception of a low-strength signal. However, in both cases, such circuits have been complex in nature with a resulting undesirable increase in added cost. Attempts at reducing the cost of the circuit have generally resulted in incomplete suppression of the background noise.

Accordingly, it is an object of the present invention to provide a muting circuit for an FM receiver which avoids the foregoing difficulties.

It is also an object of the invention to provide a simply constructed and inexpensive muting circuit.

It is still further an object of the invention to provide a muting circuit which completely suppresses the reproduction of noise by the receiver at times when there is no received carrier signal.

In accordance with the present invention, a muting circuit for signal-translating apparatus in an angular-modulation signal receiver comprises circuit means for supplying a signal which may include an angular-modulated signal having an average amplitude capable of dropping below a predetermined level. The circuit also includes amplitude-limiter means for amplitude-limiting the supplied signal, and being adapted to present a predetermined loading effect on the circuit means, and means for modifying the loading effect in response to a decrease in the average amplitude of the angular-modulation signal for preventing translation of the supplied signal when the average amplitude drops below the predetermined level.

For a better understanding of the present invention, together with other and further objects thereof, reference is had to the following description, taken in connection with the accompanying drawing, and its scope will be pointed out in the appended claims.

Figure 2:
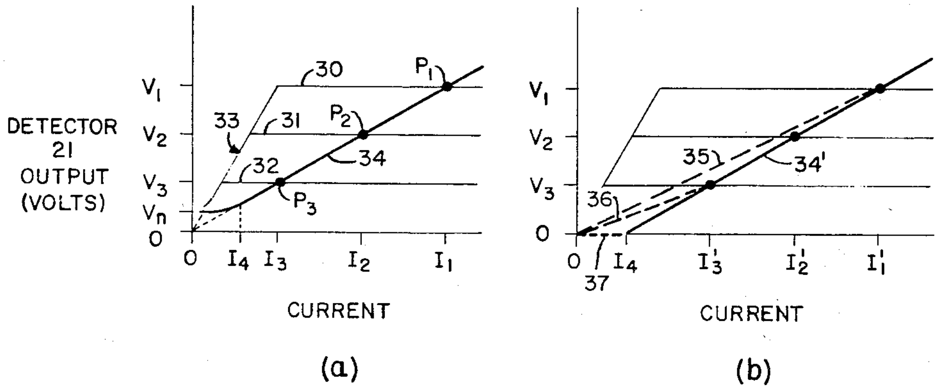

Referring to the drawing:

FIG. 1 is a block diagram, partly schematic, of a multiplex radio receiver including an embodiment of the present invention;

FIGS. 2*a* and 2*b* are diagrams useful in explaining the operation of the present invention, and FIG. 3 is a circuit diagram of an alternative embodiment of the present invention.

*Description of subcarrier receiver*

Considering now FIG. 1 of the drawing, the broadcast signal receiver shown therein is of the type adapted to receive the previously mentioned subscription-type FM/FM multiplex signal. More specifically, it is adapted to receive a main carrier signal in the FM broadcast band of 88–108 megacycles. The main carrier may be frequency-modulated by an audio-frequency program signal intended for reception by home FM receivers. Additionally, the main carrier is frequency-modulated by a subcarrier signal having a basic frequency spaced from that of the main carrier by a fixed amount, for example, 42 kilocycles. This subcarrier signal is then frequency-modulated by another audio-frequency program signal, usually totally different from the program signal on the main carrier. An example of a subcarrier program is the background music heard in establishments subscribing to this special service.

The multiplex receiver of FIG. 1 is used to reproduce the subcarrier program and, to that end, includes an antenna 10 for intercepting the transmitted multiplex signal and applying it to receiver apparatus unit 11. Unit 11 may include the usual radio-frequency amplifier, frequency changer, and intermediate-frequency amplifier circuits such as are normally found in conventional multiplex receivers. The multiplex signal at the output of unit 11 is then applied to the input of main carrier frequency detector 12, wherein both the frequency-modulated subcarrier signal and the audio-frequency main program signal are detected from the main carrier. An automatic-gain-control (AGC) voltage may be conventionally derived in detector 12 and coupled back to receiver apparatus 11 to vary the gain of the amplifier circuits therein so as to maintain the average amplitude of the composite signal at the output of detector 12 within a small range of values despite a substantially larger range thereof at input antenna 10.

Since it is intended that the receiver of FIG. 1 reproduce only the subcarrier program, there is no provision shown for utilizing the main program signal. Thus, the main program signal is removed from the composite signal by the bandpass filter in unit 13, the initial unit of the subcarrier channel. To this end, the bandpass filter may have a frequency-response characteristic symmetrically centered on the basic frequency of the subcarrier, and upper and lower pass band limits capable of translating the subcarrier modulation sidebands while, at the same time, substantially attenuating any of the audio-frequency components of the main program signal. An amplifier may be included in unit 13 at the output of the bandpass filter for amplifying the modulated subcarrier to a suitable value for use in the following portions of the receiver. As shown in FIG. 1, this amplifier may comprise, in part, a pentode with an inductive plate-load impedance of approximately 50 millihenries.

The subcarrier at the output of unit 13 is then applied through coupling capacitor 14 to amplitude-limiter circuit 15, to be described in more detail subsequently. Briefly, however, limiter 15 clips positive and negative portions of the subcarrier to derive square-wave signal which is then applied to frequency detector 21. Detector 21 may be a conventional frequency detector, for example, of the phase-discriminator type or, alternatively, it may be of the improved pulse-counter type disclosed and claimed in applicant's copending U.S. application Serial No. 84,636, filed January 24, 1961, now U.S. Patent No. 3,146,402. In that application, a resistor-capacitor differentiator circuit is used with a clamping diode to derive, in a conventional manner, a train of pulses, the average amplitude of which varies with the frequency modulation of the subcarrier. The improvement described in that application resides in the use of an inductor inserted in series with the differentiator circuit to waveshape the differentiated pulses for the purpose of improving the sensitivity and linearity of the pulse counter as a frequency detector. The detected subcarrier program signal is then amplified and reproduced in the usual manner by amplifier 22 and loudspeaker 23, respectively.

*Description of limiter-muting circuit 15*

Limiter circuit 15, in addition to being an amplitude limiter also functions, in accordance with the invention, as a muting circuit for the subcarrier channel. With respect to its function as a limiter, the circuit of FIG. 1 is of the variable threshold type, indicating that the signal clipping level is variable as a function of the average amplitude of the subcarrier signal. To this end, limiter circuit 15 includes diode 16, conductively coupled from capacitor 14 to ground for clipping off portions of the positive cycles of the applied subcarrier signal, and diode 17, conductively coupled from ground through battery 18 and resistor 19 back to capacitor 14 for clipping off portions of the negative cycles. Capacitor 20, connected between the diodes, is needed to retain the clipping voltage developed across resistor 19, and its value should be sufficiently large with respect to the value of resistor 19 to ensure that the clipping level is maintained relatively constant in the presence of incidental subcarrier modulation at an audio-frequency rate. The clipping level that is developed depends on the value of resistor 19 and, in selecting a desired value, a compromise must be made between greater output with a higher value resistance and better downward amplitude -modulation handling capability with a lower value resistance. Battery 18, inserted between resistor 19 and ground, serves to modify the limiter circuit to cause it to operate as a muting circuit at very low signal strengths and when the subcarrier is absent altogether.

*Operating of limiter-muting circuit 15*

In the following discussion of the operation of circuit 15, the presence of battery 18 will initially be ignored and the circuit treated as though resistor 19 were connected directly to ground. Assuming that diodes 16 and 17 have a zero resistance in the forward-biased direction, circuit 15 presents an average load to the pentode in amplifier unit 13 determined by resistor 19, and a dynamic load determined by capacitor 20. Thus, since the signal clipping level is a function of the average load and resistor 19 is constant-valued, the clipping level will vary in direct proportion to changes in the average amplitude of the subcarrier signal. This may be seen with respect to FIG. 2*a* which illustrates the output of detector 21 in volts as a function of the subcarrier signal current in the pentode amplifier. The solid lines 30, 31, and 32 are dynamic load lines for the limiter circuit showing the effect that audio-frequency variations in subcarrier amplitude have on the detector output signal at three different levels of pentode current, $I_1$, $I_2$, and $I_3$, respectively corresponding to three different average subcarrier signal amplitudes. Thus, with a pentode current $I_1$ there is no change in detector output until the dynamic variation in subcarrier amplitude drops below the clipping level developed across resistor 19 and capacitor 20, whereupon the detector output follows line 33.

Points $P_1$, $P_2$, and $P_3$ in FIG. 2*a* are the quiescent operating points for the three pentode currents $I_1$, $I_2$, and $I_3$. Considering the average impedance that the pentode amplifier sees looking to the right as being the ratio of the detector output volts to the pentode current at any of the quiescent points, then the slope of a line drawn from the zero point on the horizontal and vertical axes through points $P_1$–$P_3$ effectively represents the average load that limiter circuit 15 presents to the output of the pentode amplifier. Since the slope of line 34 and, consequently, the average loading effect presented by circuit 15 to the pentode remains constant regardless of signal level, the output of detector 21 is directly proportional to the average amplitude of the subcarrier signal. Theoretically, this would continue down to the zero point on the axes as shown by the dotted line. However, at some value of pentode current $I_4$, the noise-induced current becomes a significant proportion of the current induced by the FM signal at the grid of the pentode, and the output $V_n$ of detector 21 then constitutes the previously described background noise produced by the receiver. This is true whether the FM signal is at a low strength or is completely absent.

Referring now to FIG. 2*b*, the effect of the presence of battery 18 in the limiter circuit will be considered. Battery 18 operates to place a forward bias on the limiter circuit and causes the aforementioned average load effect of the circuit to vary in a manner that is related to the average amplitude of the subcarrier signal. In effect, this forward bias causes the corresponding curves of FIG. 2*a* to be shifted to the right along the horizontal axis in FIG. 2*b*. Although it requires higher pentode current to achieve the same detector output as in FIG. 2*a*, it also modifies the average loading effect of limiter circuit 15, now represented by dashed lines 35–37, as the pentode current decreases. As can be seen from the drawing, at high values of pentode current, corresponding to high signal levels, the slope of lines 34′ and 35 are almost the same and, thus, the only effect of the forward bias on the limiter circuit is a slight reduction in over-all sensitivity. However, as the pentode current decreases, the effect of the forward bias causes a significant increase in the average loading effect (i.e. decrease in circuit impedance) of circuit 15, as can be seen from the reduction in slope of line 36 as compared to line 35. Finally, it appears as a short-circuit across the pentode amplifier, represented by the zero slope of line 37.

Stating the operation of the combination limiter-muting circuit another way, the net D.-C. voltage developed across capacitor 20 determines the signal clipping level. Since the forward bias of battery 18 tends to subtract from the D.-C. voltage across resistor 19 developed by the pentode current, a slight reduction in the level of the signal at the input to detector 21 results. As the average amplitude of the subcarrier signal decreases, resulting in a decrease in pentode current, the fixed forward bias becomes a greater percentage of the net D.-C. voltage across capacitor 20 and, thus, the signal clipping level is reduced to an even greater extent than would have been produced merely by a reduction in signal level. Finally, at some indeterminate signal represented by pentode current $I_4$, the net D.-C. voltage across capacitor 20 will be essentially equal to the A.-C. voltage thereacross, thus effectively resulting in both a D.-C. and an A.-C. short-circuit across the pentode amplifier, causing a complete loss of signal output from detector 21.

*Fig. 3 Limiter-muting circuit*

FIG. 3 shows an embodiment of the invention considered to be preferable to that shown in FIG. 1 in that it does not require the addition of a battery. In this arrangement, the limiter forward bias is derived from the power supply B+ and applied to the common connection between resistor 19 and diode 17 via a high value resistor 40. Examples of component values in an actually constructed circuit, where the pentode amplifier has an inductive load of 50 millihenries and where a subcarrier frequency of 42 kilocycles is assumed, are as follows:

| | | |
|---|---|---|
| Capacitor **14** | microfarad | 0.01 |
| Capacitor **20** | do | 1.0 |
| Resistor **19** | kilohms | 47 |
| Resistor **40** | megohms | 1.2 |
| B+ supply | volts | 150 |
| Diodes **16** and **17** | Type | 1N34AS |

While there have been described what, at present are considered to be preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A muting circuit for signal-translating apparatus in an angular-modulation signal receiver comprising: circuit means for supplying a signal which may include an angular-modulated signal having an average amplitude capable of dropping below a predetermined level; amplitude-limiter means for amplitude-limiting said supplied signal, said limiter means adapted to present a pretedermined loading effect to said circuit means; and means for modifying said loading effect when the average amplitude of said angular-modulation signal decreases for preventing translation of the supplied signal when said average amplitude drops below said predetermined level.

2. A muting circuit for signal-translating apparatus in an angular-modulation signal receiver comprising: circuit means for supplying a signal which may include an angular-modulated signal having an average amplitude capable of dropping below a predetermined level; amplitude-limiter means for amplitude-limiting said supplied signal, said limiter means adapted to present a predetermined loading effect to said circuit means; and means for increasing said loading as the average amplitude of said angular-modulation signal decreases for preventing translation of the supplied signal when said average amplitude drops below said predetermined level.

3. A muting circuit for signal-translating apparatus in a frequency-modulation signal receiver comprising: circuit means for supplying a signal current which may include a frequency-modulated signal current having an average amplitude capable of dropping below a predetermined level; amplitude-limiter means for amplitude-limiting said supplied signal, said limiter means adapted to present a predetermined steady-state loading effect to said circuit means; and means for modifying said loading effect as a function of the average amplitude of said frequency-modulation signal current for preventing translation of the supplied signal current when said average amplitude drops below said predetermined level.

4. A muting circuit for signal-translating apparatus in a frequency-modulation signal receiver comprising: circuit means including a pentode amplifier circuit with a high A.C. impedance in the plate circuit thereof for supplying a signal current which may include a frequency-modulated signal current having an average amplitude capable of dropping below a predetermined level; amplitude-limiter means A.-C. coupled to said pentode plate circuit for amplitude-limiting said supplied signal, said limiter means adapted to present effectively a predetermined average impedance to said pentode amplifier; and means for modifying said effective average impedance as a function of the average amplitude of said frequency-modulation signal current for preventing translation of the supplied signal current when said average amplitude drops below said predetermined level.

5. A muting circuit for signal-translating apparatus in an angular-modulation signal receiver comprising: means for supplying a signal which may include an angular-modulation signal having an average amplitude capable of dropping below a predetermined level; amplitude-limiter means for variably amplitude-limiting said supplied signal as a function of the average amplitude of said angular-modulation signal, said limiter means adapted to present a predetermined loading effect to said circuit means; and means for forward biasing said variable amplitude limiter to modify said loading effect to prevent translation of the supplied signal when the average amplitude of said supplied angular-modulation signal drops below said predetermined level.

6. A muting circuit for signal-translating apparatus in a frequency-modulation signal receiver comprising: means for supplying a signal which may include a frequency-modulation signal having an average amplitude capable of dropping below a predetermined level; amplitude-limiter means for variably amplitude-limiting said supplied signals as a function of the average amplitude of said frequency-modulation signal, said limiter means adapted to present a predetermined loading effect to said circuit means; and means for forward biasing said variable amplitude limiter to modify said loading effect to prevent translation of the supplied signal when the average amplitude of said supplied frequency-modulation signal drops below said predetermined level.

References Cited by the Examiner

UNITED STATES PATENTS

| | | | |
|---|---|---|---|
| 2,273,934 | 2/42 | Campbell | 325—480 |
| 2,512,637 | 6/50 | Frazier | 325—479 |
| 2,617,019 | 11/52 | Hepp | 325—348 |
| 2,674,690 | 4/54 | Arguimbau | 325—473 |
| 2,914,664 | 11/59 | Paul | 325—348 |
| 3,061,683 | 10/62 | Freedman | 325—348 |

DAVID G. REDINBAUGH, *Primary Examiner.*

SAMUEL B. PRITCHARD, *Examiner.*